United States Patent Office 2,958,684
Patented Nov. 1, 1960

2,958,684

METHOD OF PROCESSING HYDROCARBON POLYMERS TO PREVENT AGGLOMERATION THEREOF

Roland Timothy Kelley and William Richard Lewis, Baton Rouge, La., assignors to Esso Research and Engineering Company, a corporation of Delaware No Drawing. Filed Apr. 16, 1956, Ser. No. 578,193

3 Claims. (Cl. 260—85.3)

This invention relates to improved processes for the production of hydrocarbon homopolymers or copolymers. More particularly, the present invention relates to improved methods of processing, for product recovery, rubbery polymerization products of isoolefins or mixtures of isoolefins with multiolefins and/or olefinic compounds containing an aromatic nucleus by the use of aqueous solutions of certain oxygenated hydrocarbons.

Polyisoolefins or copolymers of isoolefins such as isobutylene or 2-methyl-1-butene with other olefinic compounds are commercially produced in a non-aqueous diluent such as an alkyl halide having a boiling point below that of water. The polymerization is performed at low temperatures, e.g. below 50° C. and preferably below about −80° C. down to about −200° C. The polymer which is produced in a reaction zone is in the form of a slurry in the alkyl halide diluent. This slurry is then caused to flow into a flash drum where it is contacted with steam to remove volatile materials and with hot water to reslurry the polymer in aqueous suspension.

One of the major problems of handling such polymers, particularly if their Staudinger molecular weight is between about 10,000 and 100,00 for isoolefin containing copolymers or between about 50,000 and 500,000 for polyisoolefins is the agglomeration of the polymer particles into large lumps or masses that cannot be pumped through lines or otherwise conveniently processed.

It has been previously proposed in the prior art to correct this insufficiency by careful control of the temperature and pH of the water slurry and also by the addition thereto of organic anti-tack agents such as zinc stearate or sodium stearate. However, this method has not been entirely satisfactory since a portion of the solid anti-tack agent appears in the finished product as ash and/or as insoluble material. Such a process, according to the prior art, has required varying amounts of the inorganic anti-tack agents (1 to 5% based on polymer) depending upon the type and molecular weight of the polymer produced. This has resulted in varying amounts of ash content in similar polymers of different molecular weights, which for some purposes is undesirable.

According to the present invention, the foregoing difficulties are overcome by a novel process in which the hydrocarbon homopolymer or copolymer is reslurried from a non-aqueous slurry into an aqueous solution containing about 0.01 to 1.0 weight percent of an oxygenated hydrocarbon of the general formula $$A(O(CH_2)_x)_yB$$

wherein A is hydrogen or an alkyl, aryl, aralkyl, alkaryl or carboxyl radical having about 2 to 50 carbon atoms, preferably 10 to 40 carbon atoms; $x$ being an integer between about 3 to 50, preferably 2 to 10; $y$ being an integer between about 4 to 20, preferably 4 to 12; B being an hydroxy or an acyloxy radical having about 2 to 50, preferably 10 to 40 carbon atoms.

Preferred oxygenated hydrocarbons falling under the above general formula (which are poly oxyalkylene compounds) are mono-fatty rosin-acid esters of polyethylene glycols with the general structure

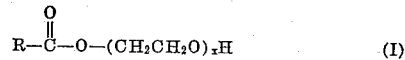

wherein R is an alkyl group containing about 10 to 50 carbon atoms, $x$ being an integer between about 6 and 30. An example of such an oxygenated hydrocarbon is the condensation product of about 15 moles of ethylene oxide with about 85 moles of rosin (abietic) acid sold under the name of Ethofat; alkyl phenoxy poly oxyethylene glycols with the general structure

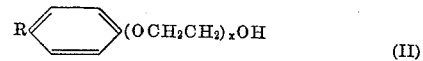

wherein R is an alkyl group containing about 4 to 20 carbon atoms, $x$ being an integer between about 4 and 20. An example of this type of oxygenated hydrocarbon is the condensation product of approximately equal quantities of nonyl phenol and ethylene oxide sold under the name of Igepal or Triton; and aliphatic poly oxyethylene ethers with the general structure $$R(OCH_2CH_2)_xOH \quad (III)$$

wherein R is an alkyl group containing about 2 to 50 carbon atoms, $x$ being an integer between about 2 and 10. An example of such an oxygenated hydrocarbon is the condensation product of tridecyl alcohol and ethylene oxide having a molecular weight of about 550 sold under the name of Sterox-A.J.

The use of a solution of one or more of the above oxygenated hydrocarbons, which are preferably polyether alcohols or derivatives thereof, has surprisingly eliminated the necessity of metal containing inorganic anti-tack agents in the production of the above types of polymers. In general, the amount of the organic compound will vary depending upon the molecular weight of the hydrocarbon homopolymer or copolymer. The lower the molecular weight of the polymeric material, the larger quantity of the oxygenated hydrocarbon compound will be employed. The amount of the oxygenated hydrocarbon material, based on 100 parts by weight of polymer will vary between about .005 to about .05 part by weight, advantageously from about .01 to about .02 part by weight and preferably .01 to .015 part by weight.

Reslurrying temperatures are sufficiently high to volatilize the non-aqueous diluent, i.e. between about 100 to 180° F., preferably about 140 to 160° F.

One advantageous hydrocarbon copolymer which may be processed according to the improved method of the present invention is butyl rubber. Butyl rubber comprises a copolymer of a $C_4$–$C_8$ isoolefin such as isobutylene with a $C_4$–$C_{14}$, preferably a $C_4$–$C_8$ multiolefin, prepared at low temperatures by Friedel-Crafts catalysts. The preferred multiolefins are isoprene, butadiene, dimethyllyl, myrcene, allo-ocymene, and the like; isoprene being preferred. Conventional methods of preparing butyl rubber polymers are described in U. S. Patent 2,356,128.

In preparing butyl rubber, the monomers are mixed in a preferred ratio of about 85 to 99.5 parts by weight of the isoolefin to about 0.5 to 15 parts by weight of the multiolefin. The mixture of monomers is cooled to a temperature between about 0° to −200° C., advantageously −40° to −160° C., preferably −80° C. to −110° C. The cold mixture is then polymerized by the addition thereto of about 0.15% to 1.0% by weight based on monomers, of a Friedel-Crafts catalyst, preferably an aluminum halide such as aluminum chloride dissolved in an alkyl halide such as methyl chloride. Powerful and efficient stirring and agitation is desirable to disperse the catalyst into the cold olefinic material, The polymerization proceeds rapidly to yield the desired polymer which precipitates out from the solution in the form of a flocculent white solid having many of the physical characteristics of raw gum rubber. The cold methyl chloride-butyl slurry is then flowed into a flash drum where it is contacted with steam and hot water which may contain an alcohol, aldehyde or any organic acid to inactivate the catalyst. The steam and hot water also serve the purpose of flashing off the catalyst solvent, unpolymerized olefins, etc., leaving the non-volatile butyl rubbery polymer in the water as a slurry.

It is, as previously stated, to the foregoing rubbery polymer-water slurry that according to the present invention, the oxygenated hydrocarbon is added, optionally but preferably along with about 0.05 to 1.0, especially about 0.1 to 0.4 part by weight of an oxidation stabilizer such as n-lauroyl-para-aminophenol, ditertiary butyl-para cresol, phenyl beta naphthylamine, etc. per 100 parts of the hydrocarbon polymer.

In practicing the invention, in order to avoid agglomeration of polymer particles, means are provided for immediately dispersing the material leaving the polymerization step with a large body of steam into an aqueous solution of an oxygen containing hydrocarbon of one of the types hereinbefore mentioned. The large body of the fluid so obtained is vigorously agitated to insure efficient heat transfer, to prevent the formation of polymer "ice" or other solid matter, and to effect substantial complete elimination of non-aqueous materials. The vapor space in the flashing zone is made sufficiently large to substantially even out the flow of gas therefrom to the recovery equipment and the gas outlet to the recovery system is adequately protected against surges. The pressure under which the flash tank is operated may be maintained close to atmospheric pressure or it may be sufficiently high so that while the reaction liquids are rapidly vaporized at the relatively warm temperature of the flashing zone, the vapors may be readily condensed with the aid of cooling water without the aid of gas compressors or refrigeration. A second flashing zone in series with the first may also be employed. Atmospheric or preferably subatmospheric pressure is maintained in the second flashing zone, the vapors therefrom being advantageously vented or compressed and combined with those from the first stage. The polymer is removed from the flashing zone through a seal of the flashing liquid thereby preventing loss or escape of the vapors liberated in the flashing zone.

The second flashing or stripping zone may or may not be included. As beforementioned, when it is provided, it is preferably operated at a pressure substantially lower than that of the first flashing zone (e.g. about 2 to 10 p.s.i.a.). It may be operated with or without additional supply of heat or stripping vapors.

The resulting butyl rubber copolymer, as recovered, generally has a relatively low unsaturation, as indicated by an iodine number of about 0.5 to 50, preferably 1 to 20. The butyl copolymer generally has a Staudinger molecular weight of at least about 20,000 up to about 100,000, advantageously between about 30,000 and 70,000.

High molecular weight polyisobutylene having a Staudinger molecular weight above about 100,000 and preferably about 200,000 to 500,000 is another rubbery polymer which may also be processed in an improved manner according to the present invention. Polyisobutylene is advantageously made by polymerizing isobutylene in one to 10 volumes of methyl chloride or other lower alkyl halides at temperatures between about $-50°$ to $-150°$ C., preferably $-75°$ to $-125°$ C. using a strong Friedel-Crafts catalyst such as aluminum chloride dissolved in methyl chloride. The isobutylene is preferably of at least 99% purity. Polymerization may be conveniently carried out in a commercial plant normally intended for making butyl rubber in accordance with the invention as outlined above.

In introducing the aqueous solution of the organic oxygenated hydrocarbon into the flash tank or tanks it is preferred that, if it is about an 0.1 weight percent solution, the addition rate be about 500 to 5000, preferably 1,000 to 3,000 pounds per hour per producing reactor. The average butyl-slurry water circulation rate is between about 75,000 to 125,000, preferably 90,000–100,000 pounds per hour. The amount of the organic oxygenated hydrocarbon remaining in the finished polymer, if 100% of the theoretically possible amount remained in the polymer through the finishing operations, would be less than about 0.01 weight percent.

Another type of polymer which is advantageously processed in accordance with the present invention is the copolymerization product of a $C_4$ to $C_8$ isoolefin with a monoolefinic compound containing an aromatic nucleus such as styrene, alphamethyl styrene, p-methyl styrene, indene, dihydronaphthalene, divinyl benzene, p-chlorostyrene, dichlorostyrene, mixtures thereof, etc. The polymer may be produced by reacting about 5–95%, advantageously about 20–80%, preferably about 30–60% of the isoolefin with about 5–95%, advantageously about 20–80%, preferably about 40–70% of the monoolefinic aromatic compound. The product is advantageously formed by Friedel-Crafts polymerization of the above monomers at temperatures below $-50°$ C. and preferably between about $-80°$ and $-200°$ C. in the presence of an alkyl halide diluent. The resulting product has a Staudinger molecular weight between about 10,000 and 500,000, preferably between about 10,000 and 100,000; the intrinsic viscosity of the polymer being between about 0.5 and 3.0. Further details for the production of such polymers are described in U.S. Patents 2,274,749; U.S. 2,519,092; and U.S. 2,643,993.

The details and advantages of the present invention will be better understood from a consideration of the following experimental data:

EXAMPLE

*Run 1*

A reactor, which was indirectly cooled and maintained at about $-140°$ F. (i.e. $-95°$ C.) by means of boiling liquefied ethylene, was charged with approximately 11,000 pounds per hour of a feed containing 30 weight percent isobutylene, 2.5% isoprene, and 67.5% methyl chloride on a continuous basis. Seven hundred pounds per hour of catalyst solution consisting of methyl chloride containing 0.15% of aluminum chloride were supplied to the reactor. The aluminum chloride solution was added in the form of a solution under 110 p.s.i.g. pressure to the body of the cold olefinic mixture which was being rapidly stirred. The polymerization reaction began immediately and proceeded to a conversion of about 75% of the olefinic material into polymer; the yield of polymer being approximately 2300 pounds per hour. The cold methyl chloride-butyl rubber slurry formed in the reactor was then continuously overflowed at a rate of about 12,000 pounds per hour into a flash drum where it was contacted with 4,000 pounds of steam having a temperature of about 300° F. and a pressure of 60 p.s.i.g. The flash drum was also continuously injected according to the invention with 2200 pounds per hour of hot water having a temperature of 150° F. and containing 0.1 weight percent of the condensation product of tridecyl alcohol with ethylene oxide, having a molecular weight of about 550, and sold under the name of Sterox-A.J.

The above polyoxyethylene ether type condensation product, i.e. Sterox-A.J., remaining in the polymer was less than 0.01% by weight, e.g. 0.005 wt. percent. The average slurry water circulation rate was 95,000 pounds per hour.

The butyl rubber slurry did not tend to coagulate and was readily processed by pumping through various lines of auxiliary equipment. The water in the butyl rubber slurry was then removed by dewatering on a vacuum type rotary Oliver filter and drying the remaining butyl rubber polymer formed at a temperature of 250° to 310° F. (e.g. 280° to 300° F.) at atmospheric pressure. The butyl rubber polymer recovered had an iodine number of about 2.3, and a Staudinger molecular weight of about 55,000.

Run 2

The same general process as in Run 1, was repeated except that the flash drum was not injected with an oxygenated hydrocarbon (i.e. Sterox-A.J.); the flash drum being injected solely with steam and hot water. The butyl rubber slurry formed coagulated very badly and was not readily processed by pumping through the lines leading to and from the reactor.

While the foregoing example relates to the improved polymer recovery process of the invention as applied to butyl rubber, improved results have also been obtained in the recovery of copolymers of 40–60% styrene with 40–60% isobutylene. When practicing the present invention employing the last mentioned type of copolymer, it has been found that stable aqueous dispersions of this type of polymer are obtained without the necessity of regulating the dispersing temperature or pH of the system as carefully as required heretofore.

Resort may be had to various modifications and variations without departing from the spirit of the invention or the scope of the appended claims.

What is claimed is:

1. A process which comprises preparing a rubbery polymer of a $C_4$ to $C_8$ isoolefin slurried in a non-aqueous diluent; introducing said non-aqueous slurry into a flashing zone with an aqueous solution therein consisting of 100 parts by wt. of water and 0.01 to 1.0 part of the condensation product of tridecyl alcohol with ethylene oxide to prevent agglomeration of said polymer; flashing off said non-aqueous diluent in the absence of zinc stearate in said flashing zone to provide a filterable, aqueous polymer slurry comprising 0.005 to 0.05 part by wt. of said condensation product per 100 parts of said polymer; and recovering said polymer free of any zinc stearate ash content therein from said aqueous slurry.

2. The process according to claim 1 in which the rubbery polymer is the copolymer of isobutylene with isoprene.

3. The process according to claim 1 in which the aqueous solution also contains therein 0.10 to 0.40 part of an antioxidant selected from the group consisting of n-lauroyl-para-amino-phenol, ditertiary butyl-para-cresol, phenyl-beta-naphthylamine and mixtures thereof.

References Cited in the file of this patent
UNITED STATES PATENTS

| | | |
|---|---|---|
| 2,462,123 | Nelson | Feb. 22, 1949 |
| 2,608,541 | Troyan et al. | Aug. 26, 1952 |

OTHER REFERENCES

"Industrial and Engineering Chemistry, Ind. Ed.," vol. 35 (1943), pages 126–130.